(12) United States Patent
Djordjevic et al.

(10) Patent No.: US 8,768,175 B2
(45) Date of Patent: Jul. 1, 2014

(54) FOUR-DIMENSIONAL OPTICAL MULTIBAND-OFDM FOR BEYOND 1.4TB/S SERIAL OPTICAL TRANSMISSION

(75) Inventors: Ivan B. Djordjevic, Tucson, AZ (US); Lei Xu, Princeton, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 313 days.

(21) Appl. No.: 13/251,214

(22) Filed: Oct. 1, 2011

(65) Prior Publication Data
US 2012/0257895 A1  Oct. 11, 2012

Related U.S. Application Data

(60) Provisional application No. 61/388,856, filed on Oct. 1, 2010.

(51) Int. Cl.
*H04L 27/26* (2006.01)
*H04B 10/548* (2013.01)
*H04J 14/06* (2006.01)

(52) U.S. Cl.
CPC .......... *H04B 10/548* (2013.01); *H04L 27/2628* (2013.01); *H04L 27/265* (2013.01); *H04L 27/2697* (2013.01); *H04J 14/06* (2013.01)
USPC .......................................... 398/184; 398/152

(58) Field of Classification Search
USPC ................. 398/66, 79, 81, 183, 184
See application file for complete search history.

(56) References Cited

U.S. PATENT DOCUMENTS

| | | | | |
|---|---|---|---|---|
| 8,693,876 B2 * | 4/2014 | Krause et al. | ................. | 398/115 |
| 8,693,890 B2 * | 4/2014 | Qian et al. | .................... | 398/188 |
| 2007/0071126 A1 * | 3/2007 | van Rooyen | .................. | 375/267 |
| 2007/0230605 A1 * | 10/2007 | Osseiran et al. | ............... | 375/260 |
| 2008/0163025 A1 * | 7/2008 | Djordjevic et al. | ............ | 714/755 |
| 2009/0225878 A1 * | 9/2009 | Papadopoulos et al. | ...... | 375/260 |
| 2010/0329683 A1 * | 12/2010 | Liu | ................................ | 398/81 |
| 2011/0026924 A1 * | 2/2011 | Chung et al. | .................... | 398/79 |
| 2011/0150503 A1 * | 6/2011 | Winzer | ........................ | 398/202 |
| 2012/0140614 A1 * | 6/2012 | Choi et al. | .................... | 370/208 |
| 2012/0148255 A1 * | 6/2012 | Liu et al. | ....................... | 398/136 |
| 2012/0207470 A1 * | 8/2012 | Djordjevic et al. | ............ | 398/44 |
| 2012/0257896 A1 * | 10/2012 | Djordjevic et al. | ............ | 398/65 |
| 2012/0263251 A1 * | 10/2012 | Djordjevic et al. | ........... | 375/261 |
| 2013/0259101 A1 * | 10/2013 | Earnshaw et al. | ............. | 375/219 |
| 2013/0259161 A1 * | 10/2013 | Lim | ............................. | 375/302 |
| 2013/0262130 A1 * | 10/2013 | Ragot et al. | ................... | 704/500 |
| 2013/0279919 A1 * | 10/2013 | Yokoi | ........................... | 398/183 |

OTHER PUBLICATIONS

J. Hong and T. Schmidt, "40G and 100G modules enable next generation networks," in Proc. SPIE, Communications and Photonics Conference and Exhibition 2009 (ACP 2009) 7631, 763115 (2009).

(Continued)

*Primary Examiner* — David Payne
*Assistant Examiner* — Tanya Motsinger
(74) *Attorney, Agent, or Firm* — Joseph Kolodka; Akitaka Kimura

(57) ABSTRACT

Systems and methods are disclosed to perform four-dimensional optical multiband OFDM communication by organizing an N-dimensional (ND) signal constellation points as a signal matrix; performing 2D-inverse FFT and 2D-FFT to perform modulation and demodulation, respectively; and applying both orthogonal polarizations in the OFDM communication to deal with chromatic dispersion, PMD and PDL effects, and multidimensional signal constellation to improve optical signal-to-noise ratio (OSNR) sensitivity.

19 Claims, 5 Drawing Sheets

(56) References Cited

OTHER PUBLICATIONS

H. G. Batshon, I. B. Djordjevic, L. Xu and T. Wang, "Modified hybrid subcarrier/amplitude/ phase/polarization LDPC-coded modulation for 400 Gb/s optical transmission and beyond," Opt. Express 18, 14108-14113 (2010).

H. G. Batshon, I. B. Djordjevic, L. Xu and T. Wang, "Multidimensional LPDC-coded modulation for beyond 400 Gb/s per wavelength transmission," IEEE Photon. Technol. Lett. 21, 1139-1141 (2009).

I. B. Djordjevic, M. Arabaci, and L. Minkov, "Next generation FEC for high-capacity communication in optical transport networks" J. Lightw. Technol. 27, 3518-3530 (2009).

J. McDonough, "Moving standards to 100 GbE and beyond," IEEE Appl. & Practice 45, 6-9 (2007).

Y. Ma, Q. Yang, Y. Tang, S. Chen and W. Shieh, "1-Tb/s single-channel coherent optical OFDM transmission over 600-km SSMF fiber with subwavelength bandwidth access," Opt. Express 17, 9421-9427 (2009).

Y. Tang and W. Shieh, "Coherent optical OFDM transmission up to 1 Tb/s per channel," J. Lightw. Technol. 27, 3511-3517 (2009).

R. Nagarajan et al., "Large-scale photonic integrated circuits," IEEE J. Sel. Top. Quantum Electron. 11, 50-64 (2005).

* cited by examiner

FOUR-DIMENSIONAL OPTICAL MULTIBAND-OFDM FOR BEYOND 1.4TB/S SERIAL OPTICAL TRANSMISSION

This application claims priority to Provisional Application 61/388,856, filed Oct. 1, 2010, the content of which is incorporated by reference.

BACKGROUND

The optical communication systems have been evolving rapidly in recent years in order to adapt to the continuously increasing demand on transmission capacity, coming mainly from the growing popularity of the Internet and multimedia in everyday life. In order to keep the system complexity reasonably low, the new optical communications solutions have to offer affordable upgrades of currently available optical communication systems operating at lower speeds to satisfy the required higher speeds. One such approach was based on multidimensional coded modulation. Namely, by increasing the number of dimensions (i.e., the number of orthonormal basis functions), we can increase the aggregate data rate of the system without degrading the bit error rate (BER) performance as long as orthogonality among basis functions is preserved. Most of the papers on multidimensional signal constellations for optical communications so far have been related to single carrier systems.

In the recent years, with the rapid growth of data-centric services and the general deployment of broadband access networks, there have been strong demand driving the DWDM network upgrade from 10 Gb/s per channel to more spectrally-efficient 40 Gb/s or 100 Gb/s per channel, and beyond. The 100 Gb/s Ethernet (100 GbE) is currently under standardization for both local area networks (LANs) and wide area networks (WANs). The next natural step would be the introduction of 1 Tb/s Ethernet (1 TbE).

SUMMARY

In one aspect, systems and methods are disclosed to perform four-dimensional optical multiband OFDM communication by organizing an N-dimensional (ND) signal constellation points as a signal matrix; performing 2D-inverse FFT and 2D-FFT to perform modulation and demodulation, respectively; and applying both orthogonal polarizations in the OFDM communication to deal with chromatic dispersion, PMD and PDL effects, and multidimensional signal constellation to improve optical signal-to-noise ratio (OSNR) sensitivity.

In another aspect, a four-dimensional (4D) coded multiband-OFDM scheme suitable for beyond 1.4 Tb/s serial optical transport is disclosed. The scheme organizes the N-dimensional (ND) signal constellation points in the form of signal matrix; employs 2D-inverse FFT and 2D-FFT to perform modulation and demodulation, respectively; and exploits both orthogonal polarizations. This scheme can fully exploit advantages of OFDM to deal with chromatic dispersion, PMD and PDL effects; and multidimensional signal constellations to improve OSNR sensitivity of conventional optical OFDM. The improvement of 4D-OFDM over corresponding polarization-multiplexed QAM (with the same number of constellation points) ranges from 1.79 dB for 16 point-4D-OFDM up to 4.53 dB for 128 point-4D-OFDM.

Advantages of the preferred embodiments may include one or more of the following. The system improves dramatically OSNR sensitivity by using 4D signal constellations instead of conventional 2D constellations (QAM or PSK). At the same time, the system offers several additional advantages compared to signal carrier, such as excellent chromatic dispersion, PMD and PDL tolerance. The two-layer integrated circuit hierarchy based on 4D multiband-OFDM is an excellent candidate for beyond 1 Tb/s serial optical transmission as it provides several dBs improvement in OSNR sensitivity compared conventional polarization-multiplexed coherent optical OFDM. With the inventive scheme, transmission distances beyond 2000 km at ultra-high spectral efficiency ($\geq 7$ bits/s/Hz) are possible. In combination with quasi-cyclic LDPC codes of large girth, the system can achieve beyond 1 Tb/s serial optical transmission for long-haul applications.

DESCRIPTION

Figure 1A:
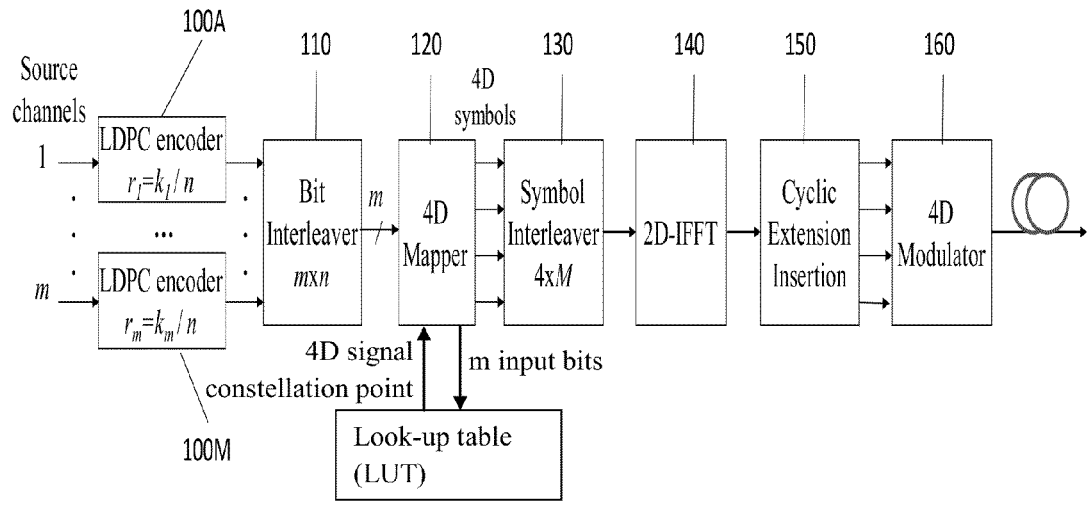
FIG. 1A shows an exemplary 4D LDPC-coded OFDM transmitter.
Figure 1B:
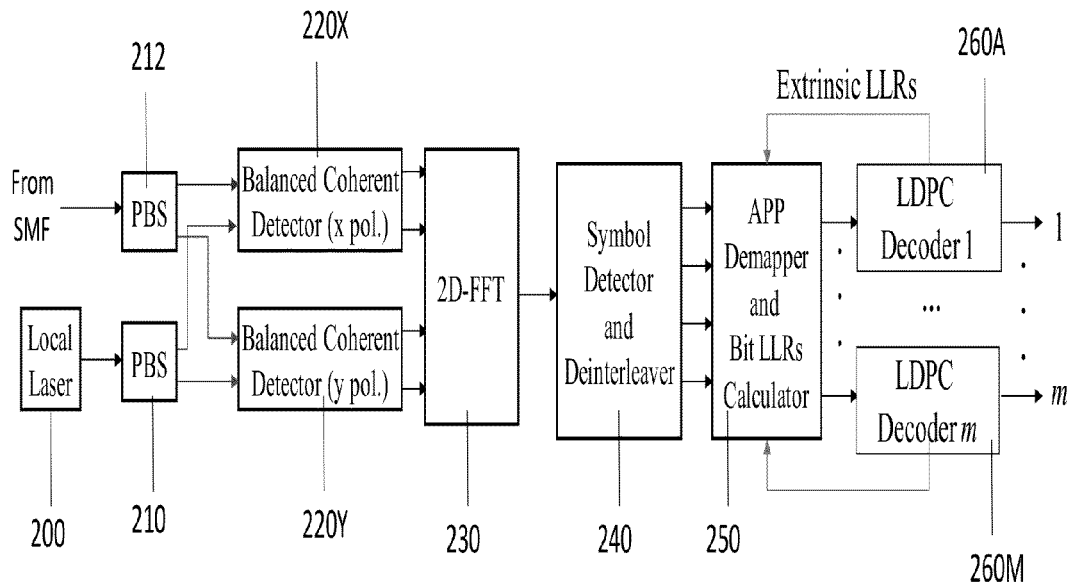
FIG. 1B shows one exemplary 4D LDPC-coded OFDM receiver.
Figure 1C:
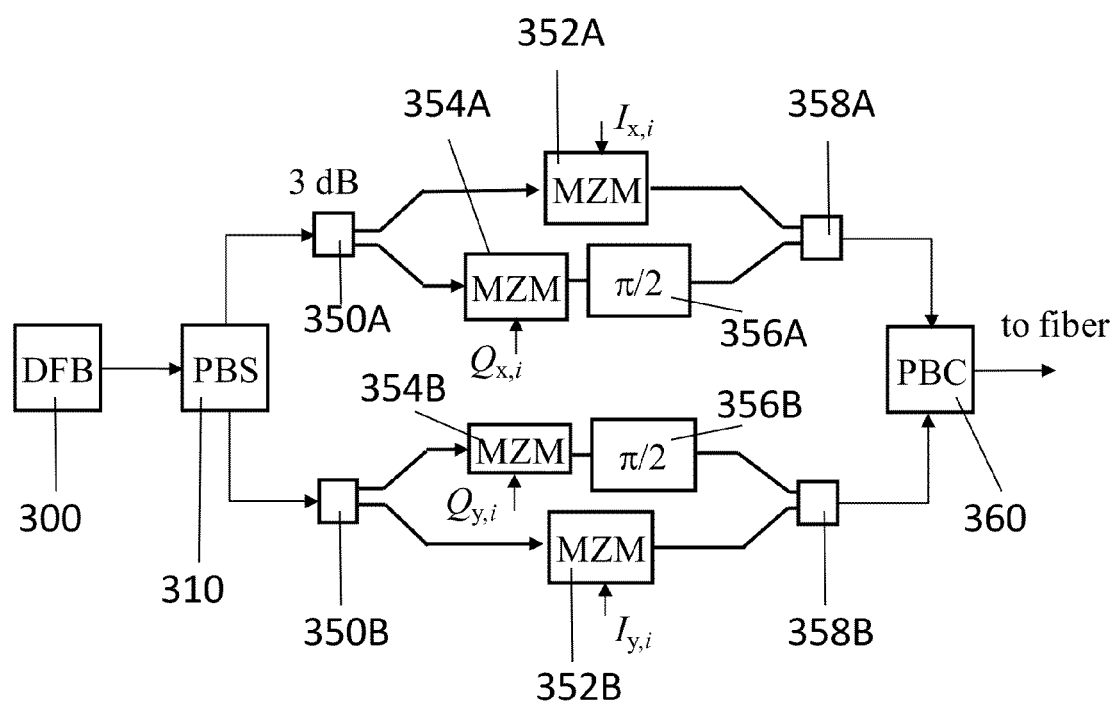
FIGS. 1C-1D show exemplary 4D modulator configurations.

One exemplary 4D LDPC-coded optical OFDM system is shown in FIGS. 1A-1C. Turning now to FIG. 1A, an exemplary 4D LDPC-coded OFDM transmitter is shown. In FIG. 1A, data from a plurality of source channels are fed to corresponding LDPC encoders 100A-100M. The output of the LDPC encoders 100A-100M are provided to a bit interleaver 110, which drives a 4D mapper 120. 4D symbols are provided to a symbol interleaver 130. The output is provided to a 2D IFFT block 140. Cyclic extensions are inserted by an insertion module 150, and the output is modulated by a 4D modulator 160.

The system maps multidimensional signal constellation points in coherent optical orthogonal frequency division multiplexing (OFDM) systems. The system exploits all advantages of both of OFDM and multidimensional single carrier systems. The multidimensional mapper for OFDM can be described as follows. In this system, N-dimensional signal constellation points are represented as $S=(S^{(0)}, S^{(1)}, \ldots, S^{(l)}(l=0, \ldots, N-1)$ is the lth coordinate. The duration of the signal frame is M signal constellation points. The system can represent the signal constellation points in matrix form, by placing the coordinates of signal constellation points along the columns of a signal matrix. The system further applies two-dimensional inverse fast Fourier transform (2D-IFFT) to obtain 2D-IFFT array of complex numbers. The coordinates of complex numbers can be considered as in-phase (I) and quadrature (Q) channels, while even and odd rows of two-dimensional array can be mapped to x- and y-polarizations, respectively. The arbitrary N-dimensional ($N=2, 3, 4, 5, \ldots$) signal constellation can be used in combination with this scheme. Because in optical channel four bases functions (in-phase, quadrature, x-polarization and y-polarization) are available, the full advantage of this scheme can be obtained by employing the 4D signal constellations. All other steps of this 4D-OFDM scheme are similar to conventional coherent optical OFDM, which is two-dimensional.

Referring now to FIG. 1B, one exemplary 4D LDPC-coded OFDM receiver is shown. In the receiver, a local laser 200 drives a polarization beam splitter PBS 210. Data from the SMF is provided to a PBS 212. The outputs of the PBSes 210 and 212 are provided to balanced coherent detectors 220X and 220Y, respectively. Next, a 2D-FFT block 230 performs two-dimensional fast Fourier transform on 4D input sample sequences and feeds the result to a symbol detector and deinterleaver 240. The symbol estimates are then processed by an APP (a posteriori probability) demapper and Bit LLR (log-likelihood ratio) calculator 250, whose outputs are provided to a plurality of LDPC decoders 260A-260M, operating in parallel.

On the receiver side, a conventional polarization-diversity receiver is used, followed by 2D-FFT demapper. Therefore, this scheme can fully exploit the advantages of OFDM as an efficient way to deal with chromatic dispersion, polarization mode dispersion (PMD) and polarization dependent loss (PDL) effects. At the same time the system can exploit the advantages of multidimensional signal constellation to improve the optical signal-to-noise ratio (OSNR) sensitivity of conventional optical OFDM dramatically. A 4D coherent optical multiband-OFDM scheme can be used to enable beyond 1.4 Tb/s serial optical transmission.

FIG. 1C shows an exemplary 4D modulator configuration in Cartesian (I/Q) coordinates. In FIG. 1C, a DFB 300 is connected to a PBS (polarization beam splitter) 310, which splits two orthogonal polarizations (x- and y-polarizations), with corresponding outputs being used as inputs to 3 dB couplers 350A corresponding to x-polarization and 350B corresponding to y-polarization the first two outputs of 4D mapper 120 are used as inputs to an MZM blocks 352A and MZM block 354A, respectively. The other two outputs of 4D mapper 120 are used as inputs two MZMs 352B and 354B, respectively. The first and the third outputs of 4D mapper 120 corresponds to in-phase coordinates $I_x$ and $I_y$, while the second and fourth outputs correspond to quadrature coordinates $Q_x$ and $Q_y$, which the $\pi/2$ phase-shifters 356A and 356B, respectively. The $I_x$ and $Q_x$ coordinates are combined by a 3 dB coupler 358A, while $I_y$ and $Q_y$ coordinates by 358B. The x- and y-polarization coordinates are further combined by a a PBC (polarization beam combiner) 360 that drives optical fiber (not shown).

Figure 1D:
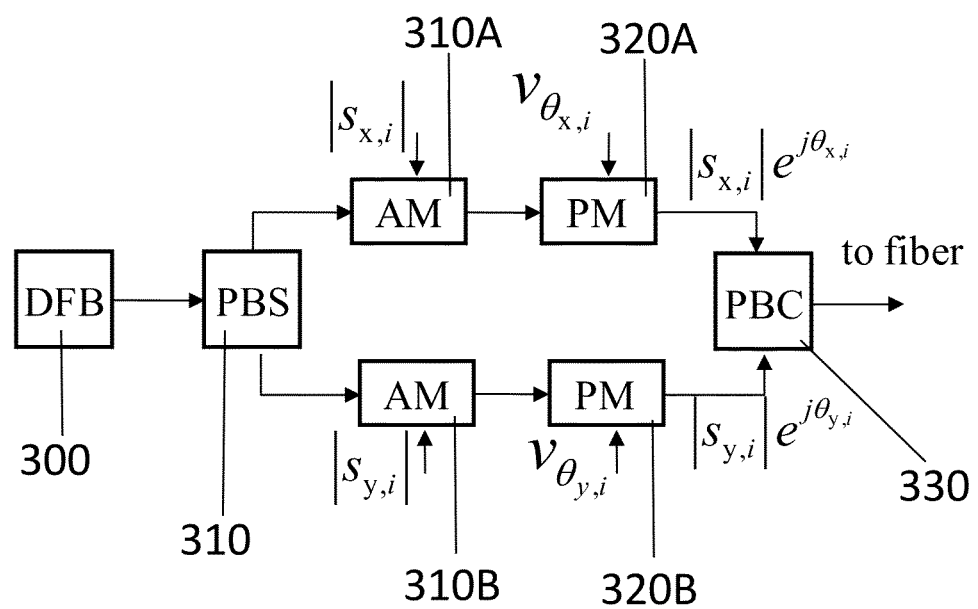

FIG. 1D shows an exemplary 4D modulator configuration in polar (amplitude/phase) coordinates. A distributed feedback laser DFB 300 drives a PBS 310, which splits two orthogonal polarizations. The first two coordinates from 4D mapper 120, corresponding to x-polarization, are imposed by amplitude modulator AM 310A and phase modulator PM 320A. The second two coordinates from 4D mapper 120, corresponding to y-polarization, are imposed by amplitude modulator AM 310B and phase modulator PM 320B. The x- and y-polarization coordinates are combined by a PBC 330, and send over optical transmission system of interest.

In one embodiment, the m independent data streams are encoded using different LDPC (n,$k_l$) codes (l=1, ..., m), where n denotes the codeword length and $k_l$ is the information word length of lth component code. The codewords are written row-wise into m×n bit interleaver. The m bits are taken from bit interleaver column-wise at every symbol slot i and are used as input of 4D mapper, which selects one constellation point out of $2^m$, depending on information content. The 4D mapper is implemented as a look-up table (LUT) with m input bits serving as a memory address that selects the four coordinates of 4D signal constellation point. The outputs of 4D mapper are written column-wise into 4×M symbol-like interleaver. The content of symbol interleaver can be represented as a two-dimensional array (matrix) as follows:

$$\vec{S}(\vec{k}) = [S(k_1, k_2)]_{4 \times M} = \begin{bmatrix} S_{00} & S_{10} & \ldots & S_{M-1,0} \\ S_{01} & S_{11} & \ldots & S_{M-1,1} \\ S_{02} & S_{12} & \ldots & S_{M-1,2} \\ S_{03} & S_{13} & \ldots & S_{M-1,3} \end{bmatrix}, \quad (1)$$

where the jth column $S_j = [S_{j,0} \; S_{j,1} \; S_{j,2} \; S_{j,3}]^T$ represents the coordinates of jth 4D signal constellation point $(S_j^{(0)}, S_j^{(1)}, S_j^{(2)}, S_j^{(3)})$ (j=0, 1, ... M−1). Therefore, the rows correspond to the dimensions and columns to subcarriers. Conventional PolMux OFDM requires 2×2M signaling matrix for the same amount of data, and the bandwidth requirements are therefore identical. This two-dimensional array is used as input to the two-dimensional inverse discrete Fourier transform (2D-IDFT) block, which calculates the IDFT as follows $$s(\vec{n}) = \sum_{k_1=0}^{M-1} \sum_{k_2=0}^{M-1} X(\vec{k}) e^{j\vec{n}\vec{k}2\pi/M}, \vec{k} = [k_1 \; k_2]^T, \vec{n} = [n_1 \; n_2]^T \quad (2)$$

where $x(\vec{k})$ is obtained by concatenating M/4 sub-matrix blocks of type (1), so that the duration of signal per axis is M. In (2), we use $\vec{n}\vec{k}$ to denote dot product of $\vec{n} = [n_1 \; n_2]^T$ and $\vec{k} = [k_1 \; k_2]^T$ as follows: $\vec{n}\vec{k} = n_1 k_1 + n_2 k_2$. The result of 2D-IDFT block is 2D array of complex numbers:

$$s(\vec{n}) = [s(n_1, n_2)]_{M \times M} = \begin{bmatrix} s_{00} & s_{10} & \ldots & s_{M-1,0} \\ s_{01} & s_{11} & \ldots & s_{M-1,1} \\ \vdots & \vdots & \ldots & \vdots \\ s_{0,M-1} & s_{1,M-1} & \ldots & s_{M-1,M-1} \end{bmatrix}, \quad (3)$$

where $S_{ij} = (S_{ij,I}, S_{ij,Q})$, with subscripts I and Q corresponding to in-phase and quadrature channels, respectively. The matrix (3) is further serialized into two vector-streams $\vec{x} = [s_{00} \; s_{10} \ldots s_{M-1,0} \; s_{02} \; s_{12} \ldots s_{M-1,2} \ldots]$ and $\vec{y} = [s_{01} \; s_{11} \ldots s_{M-1,1} \; s_{03} \; s_{13} \ldots s_{M-1,3} \ldots]$. The row-vector $\vec{x}$ is obtained by concatenating even rows in (3), while the row-vector $\vec{y}$ is obtained by concatenating the odd rows in (3). The elements of row-vector $\vec{x}$ (row-vector $\vec{y}$), namely $s_{x,i} = (I_{x,i}, Q_{x,i})$ [$s_{y,i} = (I_{y,i}, Q_{y,i})$], corresponding to x- (y-)polarization, are used (after digital-to-analog (D/A) conversion) as inputs to the I/Q modulator. Alternatively, the polar modulator shown in FIG. 1(c) can be used. The corresponding streams in x- and y-polarizations are multiplexed in polarization beam combiner (PBC) as shown in FIG. 1(c) and transmitted over the optical transmission system of interest. Notice that arbitrary N-dimensional (N=2, 3, 4, 5, ...) signal constellation can be used. Because in optical channel we have four bases functions available, the full advantage of this scheme can be obtained by employing the 4D signal constellations. (The cyclic extension insertion principle and A/D conversion operation are very similar to that in conventional OFDM and as such are not discussed here.)

At the receiver side, and using the polarization beam splitter (PBS), the optical signal is split into two orthogonal polarizations that are used as input into two balanced coherent detectors. The balanced coherent detectors provide the estimated in-phase and quadrature information for both polarizations. The outputs of the balanced detectors, after A/D conversion, cyclic extension removal and carrier recovery, are processed by 2D-DFT block. Notice that both 2D-IDFT and 2D-DFT can be efficiently calculated based on 2D fast Fourier transform (2D-FFT) algorithm. The simplest 2D-FFT algorithm is based on one-dimensional FFT and requires $2M \times M \log_2 M$ complex multiplications and additions. The complexity of this algorithm is $M^4/[2M^2 \log_2 M]$ times lower than that of direct 2D-DFT computation. Upon the deinterleaving, the symbol log-likelihood ratios (LLRs) are calculated in the a posteriori probability (APP) demapper using the following equation, $$\lambda(S_i) = \log[P(S_0|R_i)/P(S_i|R_i)], \quad (4)$$

where $P(S_i|R_i)$ is determined by Bayes' rule as:

$$P(S_i|R_i) = P(R_i|S_i)P(S_i) \Big/ \sum_{S'} P(R_i|S_i')P(S_i'). \quad (5)$$

By substituting Eq. (5) into Eq. (4) we obtain:

$$\lambda(S_i) = \log\left[\frac{P(R_i|S_i)P(S_i)}{P(R_i|S_0)P(S_0)}\right] = \\ \log\left[\frac{P(R_i|S_i)}{P(R_i|S_0)}\right] + \log\left[\frac{P(S_i)}{P(S_0)}\right] = \log\left[\frac{P(R_i|S_i)}{P(R_i|S_0)}\right] + \lambda_a(S_i), \quad (6)$$

where $\lambda_a(S_i) = \log[(S_i)/P(S_0)]$ is the prior symbol LLR, which can be calculated by:

$$\lambda_a(\hat{s}) = \sum_{j=1}^{m} c_j L_{D,e}(c_j), \quad (7)$$

where $$L_{D,e}(\hat{c}_j) = L(c_j^{(t)}) - L(c_j^{(t-1)}), \quad (8)$$

and $c_j$ denotes the jth bit in the observed symbol S binary representation $c = (c_0, c_1, \ldots)$. In Eq. (8), we use $L(c^{(t)}_j)$ to denote the LDPC decoder output in current iteration (iteration t).

In the above equations $S_i = [S_i^{(0)} S_i^{(1)} S_i^{(2)} S_i^{(3)}]^T$ denotes the transmitted signal constellation point, $R_i$ denotes the received constellation point, and $S_0$ denotes the referent constellation point. The $P(R_i|S_i)$, from equation (6), denotes the conditional probability that can be estimated by collection of histograms. The bit LLRs $L(c_j)$ are determined from symbol LLRs by $$L(\hat{c}_j) = \log \frac{\sum_{c:c_j=0} \exp[\lambda(S)] \exp\left(\sum_{c:c_k=0, k \neq j} L_a(c_k)\right)}{\sum_{c:c_j=1} \exp[\lambda(S)] \exp\left(\sum_{c:c_k=0, k \neq j} L_a(c_k)\right)}. \quad (9)$$

Therefore, the jth bit reliability is calculated as the logarithm of the ratio of a probability that $c_j=0$ and probability that $c_j=1$. In the nominator, the summation is done over all symbols S having 0 at the position j, while in the denominator over all symbols S having 1 at the position j. With $L_a(c_k)$ we denoted the prior (extrinsic) information determined from the APP demapper. The inner summation in (9) is performed over all bits of symbol S, selected in the outer summation, for which $c_k=0$, $k \neq j$. The bit LLRs are forwarded to LDPC decoders, which provide extrinsic bit LLRs for demapper according to (8) and (7), and are used as inputs to (6) as the prior information based on (7).

Similarly as in conventional coherent optical OFDM systems in quasi-linear regime, the received 4D symbol vector of kth subcarrier in ith OFDM symbol $R_{i,k} = [R^{(0)}_{i,k} R^{(1)}_{i,k} R^{(2)}_{i,k} R^{(3)}_{i,k}]^T$ can be represented by $$R_{i,k} = H_k S_{i,k} e^{j[\phi_{CD}(k) + \phi_T - \phi_{LO}]} + N_{i,k}, \quad (10)$$

where $S_{i,k} = [S^{(0)}_{i,k} S^{(1)}_{j,k} S^{(2)}_{i,k} S^{(3)}_{i,k}]^T$ denotes the transmitted symbol vector of kth subcarrier in ith OFDM symbol. The superscript (l) denotes the lth (l=0, 1, 2, 3) coordinate of corresponding signal constellation point. In (10), $N_{i,k} = [N^{(0)}_{i,k} N^{(1)}_{i,k} N^{(2)}_{i,k} N^{(3)}_{i,k}]^T$ denotes the noise vector dominantly determined by the amplified spontaneous emission (ASE) noise; $\phi_T$ and $\phi_{LO}$ denote the laser phase noise processes of transmitting and local lasers, $\phi_{CD}(k)$ denotes the phase distortion of kth subcarrier due to chromatic dispersion, and $H_k$ denotes the channel matrix of kth subcarrier, which is similar to the Jones matrix. The equivalent model of 4D OFDM scheme is similar to that of polarization-multiplexed (PolMux) OFDM, so that similar behavior is expected in terms of chromatic dispersion, PMD and PDL tolerance. As opposed to conventional polarization-multiplexed QAM based OFDM systems that multiplex two independent 2D streams, the scheme is 4D scheme and allows full potential of 4D space to be exploited. For the same symbol energy as in 2D space, in 4D space the Euclidean distance between neighboring constellation points is much larger resulting in much better BER performance. In order words, for the same target BER, the OSNR sensitivity is much better in 4D OFDM.

In order to meet high capacity demands, according to some industry experts, the 1 TbE standard is needed soon. Coherent optical OFDM is one promising pathway towards achieving beyond 1 Tb/s optical transport. Initial studies indicate that the system Q-factor when multiband OFDM with orthogonal sub-bands is used is low (about 13.2 dB after 1000 km of SMF). Such a low Q-factor represents a very tight margin in terms of 7% overhead for RS(255,239) code, and the use of stronger LDPC codes is advocated. Next, one embodiment of an LDPC-coded multiband 4D-OFDM scheme suitable for beyond 1 Tb/s optical transport is disclosed.

Figure 2A:
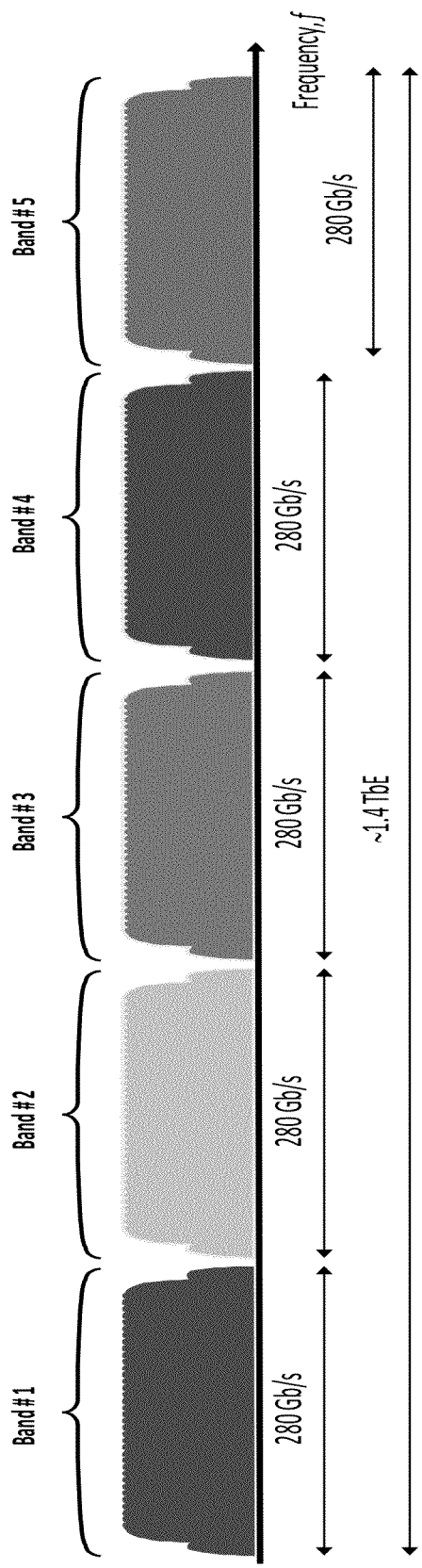
FIG. 2A shows an exemplary diagram showing an organization of the frame for multiplexing/demultiplexing at 1.4 Tb/s Ethernet.

FIG. 2A shows an exemplary diagram for multiplexing/demultiplexing enabling beyond 1 Tb/s Ethernet based on multiband 4D-OFDM. The frame corresponding to 1.4 Tb/s (see FIG. 2(a)) is organized in five OFDM bands, each carrying 280 Gb/s traffic, originating from 128-4D-OFDM described in previous section as follows 7×0.8×50 GS/s. The guard spacing between two neighboring OFDM bands is $\Delta f_G = m \Delta f_{sc}$ (m is a positive integer), where $\Delta f_{sc}$ is the subcarrier spacing. Because the central frequencies of neighboring OFDM bands are orthogonal to each other, the separation of OFDM bands can be simplified by anti-aliasing filters. Every particular input data stream to the 4D-OFDM subsystem carries 40 Gb/s traffic. The 40 Gb/s traffic can originate from either 40 GbE or 10 GbE, when the system performs RF multiplexing of four 10 GbE streams. The multiplexing/demultiplexing scheme is compatible with 10 GbE, 40 GbE and 100 GbE. For example, two 100 GbE and two 40 GbE data streams can be used as input to 4D-OFDM block to generate 280 Gb/s Ethernet traffic. Another advantage of the multiplexing/demultiplexing architecture is that it is essentially two-layer architecture (see FIG. 2(b)), while PolMux-based OFDM architecture is three-layer architecture. Finally, the architecture is based on 4D signal constellations, while conventional system is based on 2D constellations and has much stringent OSNR sensitivity requirements.

Figure 2B:
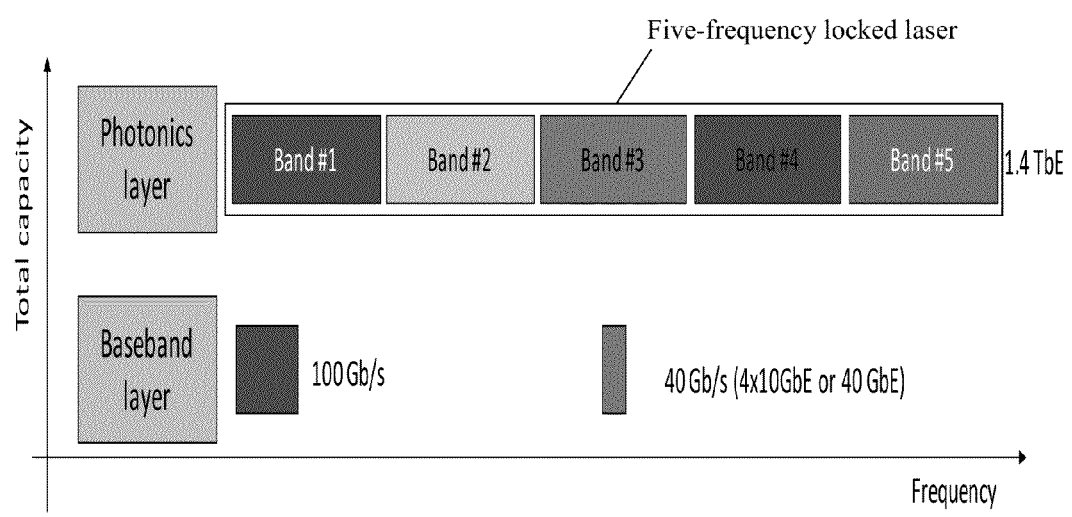
FIG. 2B shows an exemplary two-layer integrated circuit hierarchy.

FIG. 2B shows an exemplary two-layer integrated circuit hierarchy. The baseband level, at 40 Gb/s, can be straightforwardly implemented in CMOS ASIC technology, and 40 Gb/s signal can originate either from 40 GbE or 10 GbE as explained above. The baseband layer can also be combination of 40 GbE and 100 GbE data streams as indicated above. The second layer is the photonics layer, which can be implemented in photonic integrated circuit (PIC) technology, and simply requires the integration of five-frequency locked lasers that are combined optically into 1.4 Tb/s optical transport signal.

The foregoing system meets continuously increasing demands on transmission capacity. The 4D LDPC-coded multiband-OFDM scheme is suitable for beyond 1 Tb/s serial optical transport. The scheme is capable of fully exploiting the advantages of both OFDM and multidimensional signal constellation. Signal constellation points are represented in matrix form by placing coordinates of signal constellation points along columns of signal matrix. The system can apply 2D inverse FFT to obtain 2D array of complex numbers. Coordinates of complex numbers correspond to I and Q channels, while even and odd rows of 2D array correspond to x- and y-polarizations, respectively. On receiver side, the system uses conventional polarization-diversity receiver, followed by 2D-FFT demapper. The simulation results indicate that 16-4D-OFDM outperforms PolMux-8-QAM-OFDM by 1.79 dB, 32-4D-OFDM outperforms PolMux-16-QAM-OFDM by 2.14 dB, 64-4D-OFDM outperforms PolMux-32-QAM-OFDM by 2.07 dB, and 128-4D-OFDM outperforms PolMux-64-QAM by 4.53 dB. Therefore, the scheme can fully exploit advantages of OFDM, to deal with chromatic dispersion, PMD and PDL effects; and multidimensional signal constellations to improve significantly the OSNR sensitivity of conventional optical OFDM systems. The system also supports a multiband 4D-OFDM scheme enabling 1.4 Tb/s serial optical transport.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method to perform four-dimensional optical multiband OFDM communication, comprising:
  organizing an N-dimensional (ND) signal constellation points as a signal matrix;
  performing 2D-inverse FFT and 2D-FFT to perform modulation and demodulation, respectively;
  applying both orthogonal polarizations in the OFDM communication to deal with chromatic dispersion, PMD and PDL effects, and multidimensional signal constellation to improve optical signal-to-noise ratio (OSNR) sensitivity; and
  comprising performing a 4D mapping and writing outputs of 4D mapping column-wise into a 4×M symbol-like interleaver and providing to a two-dimensional inverse discrete Fourier transform (2D-IDFT) with $$s(\vec{n}) = \sum_{k_1=0}^{M-1}\sum_{k_2=0}^{M-1} X(\vec{k})e^{j\vec{n}\vec{k}2\pi/M}, \vec{k}=[k_1\ k_2]^T, \vec{n}=[n_1\ n_2]^T$$

to generate $$s(\vec{n}) = [s(n_1, n_2)]_{M\times M} = \begin{bmatrix} s_{00} & s_{10} & \cdots & s_{M-1,0} \\ s_{01} & s_{11} & \cdots & s_{M-1,1} \\ \vdots & \vdots & \cdots & \vdots \\ s_{0,M-1} & s_{1,M-1} & \cdots & s_{M-1,M-1} \end{bmatrix},$$

where $s_{ij}=(s_{ij,I},s_{ij,Q})$, with subscripts I and Q corresponding to in-phase and quadrature channels, respectively.

2. The method of claim 1, wherein signal constellation points are represented in matrix form by placing coordinates of signal constellation points along columns of signal matrix.

3. The method of claim 1, comprising applying 2D inverse FFT to obtain 2D array of complex numbers, where coordinates of complex numbers correspond to I and Q channels, while even and odd rows of 2D array correspond to x- and y-polarizations, respectively.

4. The method of claim 1, comprising encoding m independent data streams using different LDPC $(n,k_l)$ codes (l=1, ...,m), where n denotes a codeword length and $k_l$ is an information word length of lth component code and wherein the codewords are written row-wise into an m×n bit interleaver.

5. The method of claim 1, comprising selecting m bits from a bit interleaver column-wise at every symbol slot i and performing 4D mapping to select one constellation point out of $2^m$, depending on information content.

6. The method of claim 5, wherein the 4D mapping comprises a look-up table (LUT) with m input bits serving as a memory address that selects four coordinates of 4D signal constellation point.

7. The method of claim 1, comprising representing symbol interleaving content as a two-dimensional array (matrix) as:

$$S(\vec{k}) = [S(k_1, k_2)]_{4\times M} = \begin{bmatrix} S_{00} & S_{10} & \cdots & S_{M-1,0} \\ S_{01} & S_{11} & \cdots & S_{M-1,1} \\ S_{02} & S_{12} & \cdots & S_{M-1,2} \\ S_{03} & S_{13} & \cdots & S_{M-1,3} \end{bmatrix},$$

where the jth column $S_j=[S_{j,0}, S_{j,1}, S_{j,2}, S_{j,3}]^T$ represents the coordinates of jth 4D signal constellation point $(S_j^{(0)}, S_j^{(1)}, S_j^{(2)}, S_j^{(3)})$(j=0, 1, ..., M−1) and rows correspond to the dimensions and columns correspond to subcarriers.

8. The method of claim 1, comprising serializing the matrix into two vector-streams $\vec{x}=[s_{00}\ s_{10} \cdots s_{M-1,0}\ s_{02}\ s_{12} \cdots s_{M-1,2} \ldots]$ and $\vec{y}=[s_{01}\ s_{11} \cdots s_{-1,1}\ s_{03}\ s_{13} \cdots s_{M-1,3} \cdots]$.

9. The method of claim 1, comprising receiving data with a polarization-diversity receiver, followed by a 2D-FFT demapping of the data.

10. The method of claim 9, comprising using a polarization beam splitter (PBS), the optical signal is split into two orthogonal polarizations that are used as input into two balanced coherent detectors.

11. The method of claim 10, wherein the balanced coherent detectors provide estimated in-phase and quadrature information for both polarizations.

12. The method of claim 9, comprising deinterleaving and determining a symbol log-likelihood ratios (LLRs) with a posteriori probability (APP) demapping.

13. The method of claim 12, comprising determining $\lambda(S_i) = \log [P(S_i S_0 | R_i) / P = (S_i \neq S_0 | R_i)]$, where $P(S_i | R_i)$ is determined by Bayes' rule as:

$$P(S_i | R_i) = P(R_i | S_i) P(S_i) / \sum_{S'} P(R_i | S'_i) P(S'_i).$$

14. The method of claim 12, comprising determining bit LLRs in LDPC decoding from the symbol LLRs as follows $$L(\hat{v}_j) = \log \left[ \sum_{S_i : v_j = 0} \exp(\lambda(S_i)) / \sum_{S_i : v_j = 1} \exp(\lambda(S_i)) \right].$$

15. The method of claim 1, comprising multiplexing/demultiplexing data based on multiband 4D-OFDM.

16. The method of claim 15, comprising using frames corresponding organized in a plurality of OFDM bands with guard spacing between two neighboring OFDM bands as $\Delta f_G = m \Delta f_{sc}$ (m is a positive integer), where $\Delta f_{sc}$ is a subcarrier spacing.

17. The method of claim 1, comprising forming a two-layer integrated circuit hierarchy.

18. The method of claim 17, comprising forming a baseband level and a second layer as a photonics layer.

19. The method of claim 17, comprising integrating five-frequency locked lasers combined optically into 1.4 Tb/s optical transport signal.

* * * * *